Jan. 6, 1931. M. J. DIKEMAN 1,788,356
PROCESS FOR PRODUCING IGNITION FLASHES FOR GAS ENGINES
Original Filed Dec. 5, 1925
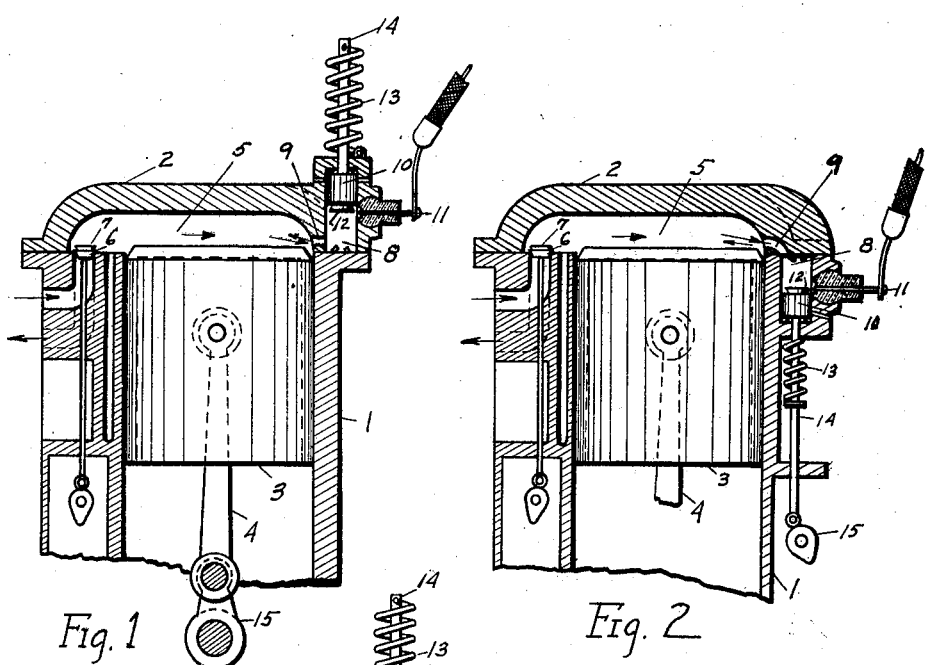
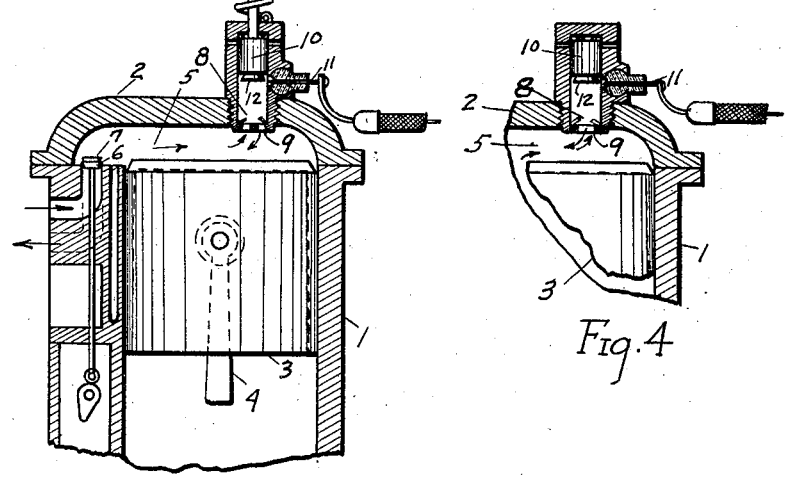
INVENTOR.
BY Myron J Dikeman
ATTORNEY.

Patented Jan. 6, 1931

1,788,356

UNITED STATES PATENT OFFICE

MYRON J. DIKEMAN, OF DETROIT, MICHIGAN

PROCESS FOR PRODUCING IGNITION FLASHES FOR GAS ENGINES

Original application filed December 5, 1925, Serial No. 73,459. Divided and application filed May 12, 1926, Serial No. 108,542. Again divided and this application filed June 3, 1926, Serial No. 113,480. Renewed April 1, 1930.

My invention relates to a process, or method, for producing ignition flashes, and especially for the purpose of igniting and exploding fuel gases within the combustion chamber of a gas engine, and this patent is a division of my application Serial No. 73,459, filed Dec. 5, 1925, and a later division Serial No. 108,542, filed May 12, 1926, both setting forth a mechanical device for accomplishing my process, through the use of a special combination of mechanical means.

It is the purpose of this invention to set forth a process for producing ignition flashes successively with the compression stroke of a gas engine, in combination with the engine combustion chamber and a small sub-chamber connected therewith, for igniting the engine fuel gas at a pre-determined position of the moving engine piston.

It is commonly known that the gas engine as used today, in most cases, is operated and ignited by an electric spark plug mounted within the engine combustion chamber, and it is further commonly known that the efficiency of the fuel gas explosion, and power derived therefrom, varies greatly with the quality of the ignition spark caused by the spark plug, and that a dirty or carbonized spark point producing a weak spark for ignition, will cause only a partial combustion of the engine fuel gases, and greatly reducing the power of the explosion therefrom. Further, that a strong, hot electric spark will produce a more complete combustion of the fuel gases, and greatly increase the power exerted within the engine cylinder. My process of ignition by flame flashes caused by a pre-mature ignition of a gas filled sub-chamber which is connected to the combustion chamber of the gas engine by a communicating passage, will emit from the said connecting passage, a flame piercing through the gases of the combustion chamber of the engine for igniting the fuel gases therein, and will greatly increase the efficiency in both combustion and power of the engine fuel gas from that possible to produce by the single electric spark which ignites the engine fuel gas in only single point with the ordinary spark plug. My process shooting flames to all parts of the engine combustion chamber, ignites the entire chamber of gas simultaneously.

It is known that other methods have been followed in attempts to produce a flash plug, and patents issued thereon, but none have made use of the principle or process as set forth herein, through the application of a pre-exhaustable sub-chamber connected by passage to the engine combustion chamber, capable of receiving a full charge of fuel gas therein prior to the premature sub-chamber gas ignition, but they have been confined, solely, to recess plugs, the chambers of which have no means for exhausting or filling, and always remain filled with air or burned and dead gases after explosion, if they will explode at all, which results in allowing only a small portion of fresh fuel gas to be pressed therein as the recess filled with air of dead gas may contract slightly under pressure of the engine compression, leaving it almost wholly inoperative, and totally ineffective as an efficient flash plug.

My process will best be understood when described, in connection with the annexed diagrammatic drawings, Figs. 1, 2, 3 and 4, which illustrate in principle, the application of my process of flash ignition as applied to gas engines, the sketches illustrating a simple, ordinary gas engine cylinder, with fuel chamber head, and movable piston fitted therein operating in connection with the ordinary engine crank.

The casing —1— representing the gas engine cylinder, with the cylinder head —2— fixedly attached thereto. The piston —3— being fitted therein and free to slide under action of the attached connecting rod —4— and engine crank —15—, and working in the ordinary manner of gas engine operation, being provided with a fuel gas combustion chamber —5— between the raised piston —3— and the engine head —2—. The engine fuel gas being drawn within the chamber —5— at the downward stroke of the piston —3—, through the gas intake valve —6— mounted at the side of the engine cylinder, said valve being operated in a manner ordinary to gas engines, opening to allow fuel gas to flow therein, and closing on the compression stroke of the piston. After ignition and expansion of the fuel gas within the combustion chamber —5—, forcing the engine piston downward and developing power thereby, the burned engine fuel gases are exhausted from the cylinder through the exhaust valve —7—, similarly placed and operated to the intake valve —6— heretofore described. The engine piston and valves operating in the ordinary manner common to gas engines. I lay no claim to the foregoing engine construction, but merely outline same to better illustrate my process of flash ignition for the fuel gas when compressed within the engine combustion chamber —5—. By providing a small connected sub-chamber adjacent to and communicating with the engine combustion chamber —5— by passage ways, and providing means for completely exhausting the gases from the sub-chamber prior to the compression stroke of the piston —3— in the gas filled cylinder of the engine, said means being capable of expanding or receding within said sub-chamber and allowing the sub-chamber to completely fill with the engine fuel gases under reaction of the engine cylinder compression, to be followed by a premature ignition and explosion of the gases within said sub-chamber, and causing flames to emit from the connecting passage way and igniting the engine fuel gases by flames which pierce therein. The sub-chamber —8— being relatively small in proportion to the connecting engine cylinder, may be made a part of the engine casting as illustrated in Figs. 1 and 2, or is a separate member and attached as illustrated in Figs. 3 and 4. The sub-chamber —8— being positioned near the engine combustion chamber —5—, and is connected therewith by a communicating passage —9— leading from one end of the sub-chamber. To accomplish a pre-exhausting of the sub-chamber —8—, I have used an accurately fitted plunger —10— mounted within the sub-chamber, and free to slide from one end to the other thereof, capable of responding to and sliding under the compression or vacuum of the engine cylinder as imparted thereto through the connecting passage —9—, forcing the plunger back and opening the sub-chamber thereby, under the engine compression and allowing the engine cylinder fuel gases to be pressed within the sub-chamber against the receding plunger —10—, completely filling the chamber —8— therewith, while, on the release of the engine cylinder compression, or by the suction vacuum caused by the receding engine piston —3— therein, likewise being communicated to the sub-chamber —8— through the connecting passage —9—, the plunger —10— is drawn or forced to the port or open end of the sub-chamber —8—, expelling all gases therefrom, through the passage —9— into the engine combustion chamber —5—, same to be expelled therefrom with the engine gases through the engine exhaust valve —7— in the usual manner common to gas engines. Should the engine cylinder pressure in the chamber —5— be sufficient to force the plunger —10— back within the chamber —8— during the exhaust stroke of the engine, or prevent its movement to the port end of the chamber, then the plunger —10— will be slightly retarded in its movement, but will function and be drawn or forced down on the return or filling stroke of the engine piston, and when the suction is caused for drawing therein fresh fuel gas within the engine cylinder, thus fully exhausting the plug chamber of all dead gases or air therein, in time to allow it to re-fill directly from the engine cylinder during the engine compression stroke. The filling and exhausting of the sub-chamber —8— continues automatically with the compression and exhaustion or filling of the engine cylinder combustion chamber —5— under action of the moving engine piston —3— therein. By this method the sub-chamber is completely exhausted of all air or dead gas, remaining closed by the plunger —10—, and completely refilled with explosive fuel gases compressed therein against the receding plunger by compression of the gases in the engine combustion chamber —5—. The action of the plunger may be assisted by application of exterior mechanical means, as illustrated by the attached coil spring —13— connected to the plunger —10— by the stem —14—, same being under stress, assists in rapid movement of the plunger for high speed engines, or a mechanical operating cam —15— may be applied to the plunger by contact with the stem end, for accomplishing the pre-exhausting of the sub-chamber and re-filling with fresh fuel gas therein. The actual mechanical means applied to the plunger is not material to my process, if the pre-exhaustion and complete re-filling with gas from the engine cylinder takes place. When the sub-chamber —8— is completely filled with the fuel gas compressed therein by the compression of the fuel gas within the engine combustion chamber —5—, said sub-chamber gas is prematurely ignited, the exact instant of ignition being timed with a predetermined position of the connected engine piston 3, the ignition of the sub-chamber gas being accomplished by an electric spark therein, as illustrated between the electric terminals —11— and —12—, one of which terminals is insulated from the frame metals, and so arranged as to connect both terminals within an electric battery circuit and cause an electric spark to pass between their interior points within said sub-chamber. The premature explosion of the gases within the sub-chamber —8—, causes a flame to emit from the connecting passage opening —9— piercing through the fuel gas within the engine combustion chamber —5—, reaching to all sections of the chamber and igniting same throughout, simultaneously, by the long flash flame, causing a full and complete combustion of all of the engine fuel gas, at a pre-determined position of the engine piston.

Having fully described my flash ignition process what I claim as my invention and desire to secure by Letters Patent is:

1. An apparatus for producing a flash ignition flame in combination with the combustion chamber of a gas engine, for igniting engine fuel within said combustion chamber, comprising a small secondary sub-chamber communicating with the combustion chamber of the engine by a small connecting passage, plunger means mounted within said secondary chamber, so actuated as to completely fill or exhaust gases within said chamber, and ignition means mounted within said sub-chamber for igniting the fuel gas within said sub-chamber when completely filled.

2. An apparatus for producing a flash ignition flame in combination with the combustion chamber of a gas engine for igniting the fuel gas within said engine, comprising a secondary sub-chamber connected to the engine combustion chamber and communicating therewith by a small port passage, a plunger fitted within said secondary chamber actuated in a manner to pre-exhaust all gases from the sub-chamber into the engine combustion chamber during the low pressure stroke, and receding then for completely filling the said sub-chamber with fuel gas from the engine cylinders during the compression stroke of the engine, and ignition ports mounted within said sub-chamber for igniting the fuel gas therein when the sub-chamber is completely filled, causing a flame to emit from the communicating passage into the engine combustion chamber.

3. An apparatus for producing a flash ignition flame in combination with the combustion chamber of a gas engine for igniting the fuel gas therein, comprising a combination of a secondary chamber attached to the walls of the engine combustion chamber, and connected to the said combustion chamber by small port passages leading from one end of the sub-chamber into the engine combustion chamber, for allowing free passage of the gases in both directions, a movable plunger fitted and mounted within the sub-chamber, designed and actuated to completely exhaust all gases therefrom during the low pressure stroke of the engine, and completely refill with fuel gas from the engine combustion chamber during the compression stroke of the engine, and ignition means mounted within said sub-chamber for igniting said fuel gas therein when the sub-chamber is completely filled, and at a pre-determined position of the engine piston, causing a flame to emit from the connecting port into the engine combustion chamber and igniting the engine fuel gas therein.

In witness whereof I sign these specifications.

MYRON J. DIKEMAN.